United States Patent
Mack et al.

(10) Patent No.: US 10,394,198 B2
(45) Date of Patent: Aug. 27, 2019

(54) TRANSMITTER AND METHOD FOR PROVIDING INDUCTIVE WIRELESS ENERGY TRANSMISSION

(71) Applicant: ROBERT BOSCH GMBH, Stuttgart (DE)

(72) Inventors: Juergen Mack, Goeppingen (DE); Guenter Lohr, Leinfelden-Echterdingen (DE); Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 14/390,323

(22) PCT Filed: Mar. 5, 2013

(86) PCT No.: PCT/EP2013/054420
§ 371 (c)(1),
(2) Date: Oct. 2, 2014

(87) PCT Pub. No.: WO2013/149778
PCT Pub. Date: Oct. 10, 2013

(65) Prior Publication Data
US 2015/0039144 A1 Feb. 5, 2015

(30) Foreign Application Priority Data
Apr. 5, 2012 (DE) .................. 10 2012 205 740

(51) Int. Cl.
| | |
|---|---|
| G05B 15/02 | (2006.01) |
| H02J 50/60 | (2016.01) |
| H02J 50/12 | (2016.01) |
| H01F 38/14 | (2006.01) |
| G05D 3/12 | (2006.01) |

(Continued)

(52) U.S. Cl.
CPC ............. *G05B 15/02* (2013.01); *H01F 38/14* (2013.01); *H02J 50/12* (2016.02); *H02J 50/60* (2016.02)

(58) Field of Classification Search
None
See application file for complete search history.

(56) References Cited

U.S. PATENT DOCUMENTS

| | | | |
|---|---|---|---|
| 7,623,886 B2 * | 11/2009 | Ma .................. | H04W 52/225 455/114.3 |
| 8,004,118 B2 | 8/2011 | Kamijo et al. | |

(Continued)

FOREIGN PATENT DOCUMENTS

| | | |
|---|---|---|
| CN | 102386685 A | 3/2012 |
| DE | 10 2006 017801 | 11/2007 |
| WO | 2011/154036 A1 | 12/2011 |

OTHER PUBLICATIONS

International Search Report for PCT/EP2013/054420, dated Feb. 7, 2014.

*Primary Examiner* — Eric C Wai
(74) *Attorney, Agent, or Firm* — Norton Rose Fulbright US LLP; Gerard Messina

(57) ABSTRACT

A transmitter for wireless energy transmission includes: a transmission device for generating an alternating magnetic field, a determination device for providing a signal which indicates an object in the area of the transmission device, and a control device for limiting the strength of the alternating field on at least three different levels based on the signal.

16 Claims, 2 Drawing Sheets

(51) Int. Cl.
*G05D 5/00* (2006.01)
*G05D 9/00* (2006.01)
*G05D 11/00* (2006.01)
*G05D 17/00* (2006.01)

(56) References Cited

U.S. PATENT DOCUMENTS

| | | | |
|---|---|---|---|
| 2009/0276014 A1* | 11/2009 | Morgan | A61N 1/3787 607/61 |
| 2010/0184371 A1* | 7/2010 | Cook | H02J 5/005 455/41.1 |
| 2011/0244913 A1 | 10/2011 | Kim et al. | |
| 2012/0049791 A1 | 3/2012 | Tanabe | |
| 2012/0204715 A1* | 8/2012 | Hagan | B01D 46/46 95/26 |
| 2013/0094598 A1* | 4/2013 | Bastami | H02J 5/005 375/259 |

* cited by examiner

TRANSMITTER AND METHOD FOR PROVIDING INDUCTIVE WIRELESS ENERGY TRANSMISSION

BACKGROUND OF THE INVENTION

1. Field of the Invention

The present invention relates to a method and a device for a wireless energy transmission.

2. Description of the Related Art

Wireless energy transmission may be used for transmitting energy inductively from a first device to a second device. The first device may include in particular a power supply and the second device may include a small electrical device having a battery or an accumulator. In order to charge the accumulator, the small electrical device is brought into a magnetic sphere of influence of the power supply and the energy transmission is started.

For the energy transmission, the power supply and the small electrical device may each include a coil, the coils being magnetically coupled to one another. With the aid of a transmitter coil, the power supply generates an alternating magnetic field, which the receiver converts back into an electric current with the aid of its receiver coil. This current may be subsequently fed to the accumulator via a charge controller.

It is possible for a magnetizable or electrically conductive object to enter the magnetic sphere of influence of the transmitter coil and become heated there in the alternating magnetic field due to eddy currents or core losses or hysteresis losses. The heating may be considerable, making it possible for a risk of accidents to emanate from the object.

The object may be detected, for example, by scanning an electrical parameter on the transmitter coil and comparing it with a predetermined threshold value. If the scanned value exceeds the threshold value, the presence of an object is inferred and the wireless transmission of energy is terminated. In order to also be able to detect a small object reliably, the comparison must occur at close tolerances. However, the danger then exists that another influence on the electrical parameter, for example, an aging effect, a system voltage fluctuation, or the only temporary presence of an object, will result in a termination of the transmission of energy. In particular, an uncontrolled transmission of energy caused by a user, such as is used for charging accumulators, may thus defeat its actual purpose.

BRIEF SUMMARY OF THE INVENTION

The object of the present invention is therefore to provide a device and a method that reduces an accident risk due to an object in the area of the wireless energy transmission path and that simultaneously ensures a reliable energy transmission.

A transmitter according to the present invention for wireless energy transmission includes a transmission device for generating an alternating magnetic field, a determination device for providing a signal which indicates an object in the area of the transmission device, and a control device for limiting the strength of the alternating field on at least three different levels based on the signal.

In contrast to a known transmitter for wireless energy transmission, the strength of the alternating field may be adjusted to the signal and accordingly to the size or the magnetic susceptibility of the determined object. This makes it possible to keep an absolute heating of the object in a predetermined framework. A premature termination of the energy transmission is preventable in this way. An energy transfer process may last longer due to a reduced strength of the magnetic field; however, the goal of transmitting a predetermined amount of energy is achievable even if the object is present.

One of the levels may be equivalent to zero strength of the alternating field. Preferably, the alternating field is only controlled on this level if the detected object is too large for safe operation of the transmitter. In the case of smaller objects, a reduced energy transmission may be activated. After the strength of the magnetic field is reduced to a value unequal to zero, not only is a further energy transmission possible, but also a later re-evaluation of the object is possible, if, for example, the influence of the object on the energy transmission is changeable, for example, because the object is removed from the magnetic sphere of influence after a time. In this case, the alternating field may also be activated again on a stronger level.

In a preferred specific embodiment, the signal indicates an energy absorbed by the object. The signal may in particular be determinable based on an electric parameter on the transmission device. This may be in particular a current flowing through the transmission device. The transmission device may include a transmitter coil.

In another specific embodiment, which is combinable with the above-mentioned specific embodiment, the transmission device may include a resonance transformer and the signal may indicate a quality factor of the resonance transformer. The resonance transformer may be formed from a series or parallel connection of the transmitter coil having a resonance capacitance. The quality factor may be determined based on an electrical parameter on the resonance transformer.

A storage device may be provided, which is designed for recording signal amplitudes and strengths of the alternating field assigned to them. This may make it easier to provide a plurality of different strengths of the alternating field. In particular, the storage device may make it easier to make a non-linear assignment between the amplitude of the signal and the strength of the alternating field. In another specific embodiment, the strength of the alternating field may also be determined based on the amplitude of the signal in another way, in particular, parametrically. The parametric determination may also be stored in the storage device; in both cases, a plurality of levels may be supported, this number being so large in one specific embodiment that a non-discrete (analog) relationship may be assumed.

In one specific embodiment, the strength of the alternating field is determined by a magnetic induction. The magnetic induction may be determined in particular by a current flowing through the transmission device. This makes it possible to advantageously determine energy absorbed by the object. In still another specific embodiment, the control device is designed for limiting an electric power of the transmission device. In particular, electrical powers of different strength may be assigned to alternating fields of different strength. A predetermined electrical power may be influenced with low complexity by controlling the current or the voltage of the transmission device.

A method according to the present invention for wireless energy transmission includes steps of determining a signal which indicates an object in the area of a transmission device for generating an alternating magnetic field, and limiting the strength of the alternating field based on the signal on at least three levels of different height.

In one preferred specific embodiment, steps of determining a maximum value of the signal over a predetermined time period and deriving threshold values of the signal for the levels as a function of the maximum value of the signal may also be included. This makes it possible for the transmitter to carry out an independent calibration, which may consider slow or long-term influences on the signal. In particular, this may compensate for aging effects of components of the transmitter for wireless energy transmission. This also makes it possible to provide a self-learning or self-calibrating transmitter for wireless energy transmission.

A computer program product according to the present invention includes program code means for carrying out the described method when the computer program product is run on a processing device or is stored on a computer-readable data medium.

The present invention is now described in greater detail with reference to the appended drawings.

DETAILED DESCRIPTION OF THE INVENTION

Figure 1:
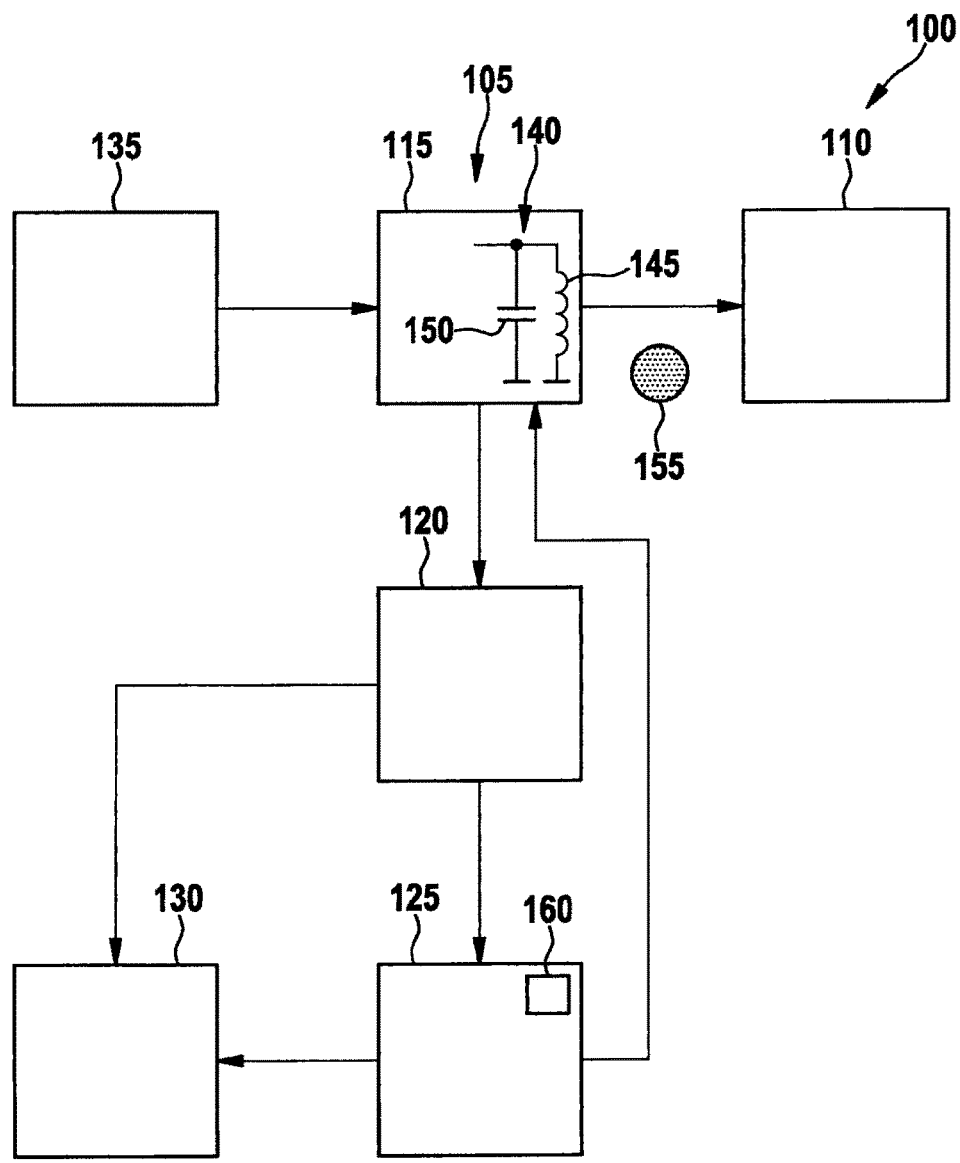
FIG. 1 shows a schematic representation of a system for wireless energy transmission.

FIG. 1 shows a schematic representation of a system 100 for wireless energy transmission. System 100 includes a transmitter 105 and a receiver 110. The transmitter may include in particular a power supply and receiver 110 may include a small electrical device, for example, a cordless tool such as a cordless screwdriver. In one preferred specific embodiment, receiver 110 includes a receiver device and an electric consumer, the electric consumer including an accumulator and, if necessary, a charge controller.

Transmitter 105 includes a transmission device 115, a determination device 120 and a control device 125 and optionally a display 130. Transmitter 105 is designed to be fed from an energy supply 135, which, for example, may be connected to an energy supply network.

Transmission device 115 may include in particular a resonance transformer 140, which includes a transmitter coil 145 and a resonance capacitance 150, which are connected to one another in series or in parallel. Furthermore, transmission device 115 may include an activation for exciting resonance transformer 140 to vibrate and supply it with energy. Based on an electrical parameter of transmission device 115, in particular of resonance transformer 140, determination device 120 is designed for determining a signal, which indicates an object 155, which is possibly located in a magnetic sphere of influence of transmission device 115.

In this connection, the strength of the determined signal is preferably a function of the power absorbed by object 155. The signal may, for example, be determined based on a current or a voltage on transmission device 115, in particular of resonance transformer 140. Alternatively, the signal is also determinable based on a quality factor of resonance transformer 140. If display 130 is provided, the signal provided by determination device 120 may be shown on display 130.

Control device 125 is designed for controlling transmission device 115 on multiple levels based on the amplitude of the signal determined by determination device 120. In this connection, the strength of the magnetic field provided by transmission device 115 is changed as a function of the signal strength on at least three levels, of which one level may be equivalent to a magnetic field of the strength zero. The power provided by transmission device 115 may be shown on display 130. In another specific embodiment, display 130 also includes a possibility for acoustic output, via which control device 125 may output an acoustic signal when, for example, transmission device 115 is activated to reduce the provided alternating magnetic field.

Control device 125 may carry out an evaluation of the signal and in particular an assignment of a scanned signal amplitude to a predetermined strength of the magnetic field of transmission device 115. For this purpose, control device 125 may include a storage device 160, on which the assignment or a series of assignments are stored absolutely, in the form of predetermined areas or parametrically. Different signals may also be processed in a fuzzy logic block.

Figure 2:
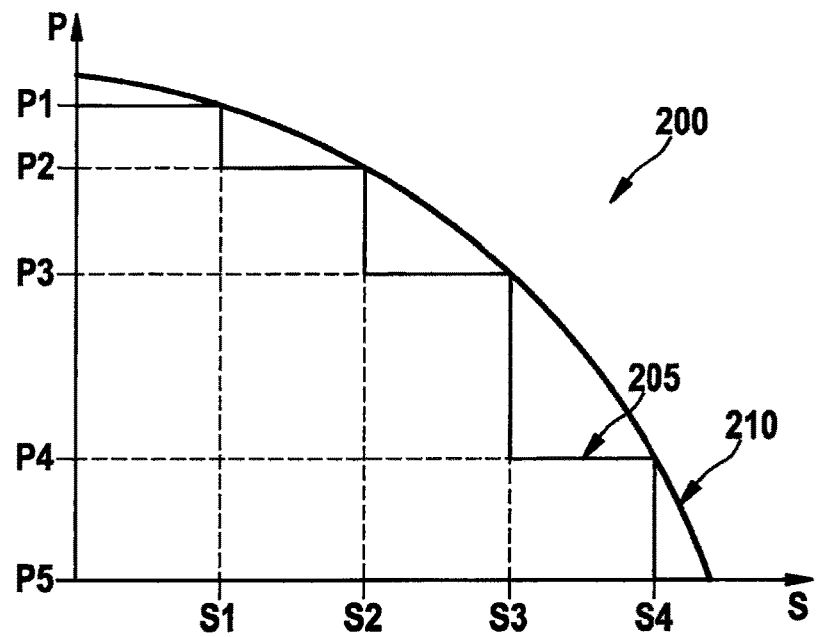
FIG. 2 shows exemplary relationships between a signal amplitude and a strength of an alternating field on the transmitter from FIG. 1.

FIG. 2 shows exemplary relationships between a signal amplitude and a strength of an alternating field on transmitter 105 from FIG. 1. The shown relationships may be stored in particular on storage device 160 of control device 125 of transmitter 105 in FIG. 1. Shown are a first relationship 205 and a second relationship 210. Both relationships 205 and 210 are each plotted as a signal S shown horizontally on a strength of the alternating field on transmitter 105 which is shown vertically.

First relationship 205 is discrete, in that it recognizes five different levels P1 through P5. If signal S is smaller than first threshold value S1, strength P of the magnetic field is not limited or is set to a maximum value of P1 due to the design of transmission device 115. If signal S lies between threshold values S1 and S2, strength P is limited to a value P2. The limitation may, for example, be made by controlling a signal curve on resonance transformer 140 or by controlling a current or a voltage on resonance transformer 140. Strength P2 is a maximum strength, so that receiver 110 is also only able to draw an amount of power from the provided alternating magnetic field that strength P2 is not reached.

In a similar manner, the magnetic field may be limited to strength P3, if signal S lies between threshold values S2 and S3, or it may be limited to strength P4 if the signal lies between threshold values S3 and S4. If signal S is greater than threshold value S4, the magnetic field may be switched off completely, which corresponds to a limitation to strength P5=0.

Shown first relationship 205 includes five levels, a relationship between the levels and the assigned signal strengths being non-linear on average. More or fewer levels may be used. If one of levels P is equivalent to the value zero, at least two additional levels P of different amplitude should be provided.

Second relationship 210 is continuous (non-discrete) and may, for example, be provided by a linear or non-linear function which plots signal strength S onto strength P of the magnetic field. In other specific embodiments, for example, a polynomial relationship between signal strength S and strength P of the magnetic field may also be provided.

Figure 3:
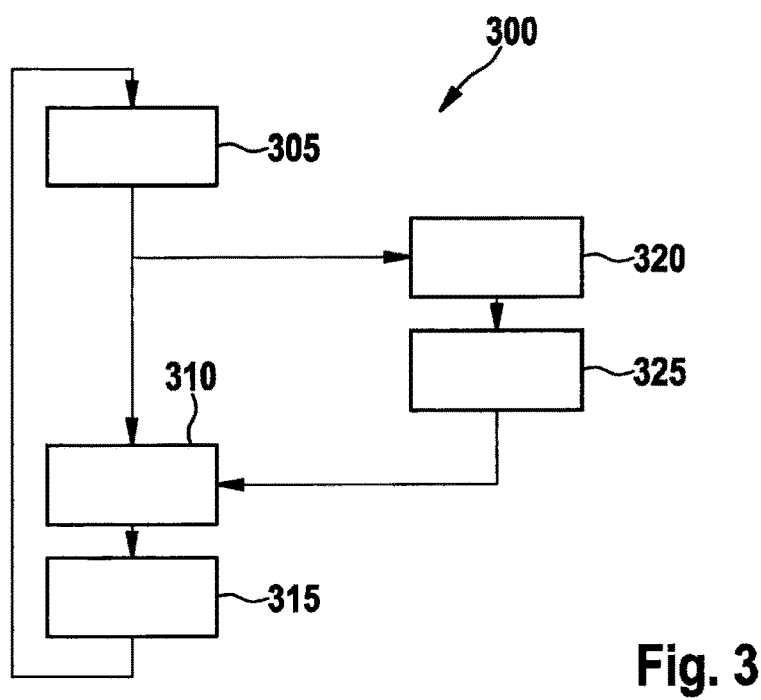
FIG. 3 shows a flow chart of a method for controlling the transmitter from FIG. 1.

FIG. 3 shows a flow chart of a method 300 for controlling transmitter 105 in system 100 from FIG. 1. In a first step 305, the strength of signal S is determined, which indicates a power, which object 155 withdraws from a magnetic sphere of influence of transmission device 115 of transmitter 105. In a subsequent step 310, the determined signal is evaluated, as described above with reference to FIG. 2, by converting it into a strength P of the magnetic field of transmission device 115, either parametrically or by comparison with threshold values. Subsequently, activation device 115 is controlled in a step 315 in such a way that the provided magnetic field does not exceed predetermined strength P. After that, method 300 may return to first step 305 and be run again.

In one specific embodiment, determined signal S may be used in a step 320 for carrying out a calibration or long-term adaptation of the evaluation of signal S. For that purpose, a maximum value of the determined signal may be determined over a predetermined period of time in step 320. In a subsequent step 325, threshold values S1 through S4 may be derived from the determined maximum value. In the case of a parametric evaluation corresponding to second relationship 210, an offset or a scaling of second relationship 210 may be adapted based on the determined maximum value.

The newly determined threshold values or the corrected parametric mapping of signal strength S onto strength P of the magnetic field may then be included in step 310.

What is claimed is:

1. A transmitter for providing inductive wireless energy transmission, comprising:
   a transmission device for generating an alternating magnetic field;
   a determination device for determining an object signal which indicates an object in the area of the transmission device, wherein the object signal is a function of the power absorbed by the object located in the magnetic field; and
   a control device for controlling the alternating magnetic field based on the object signal, wherein the control device changes the strength of the alternating magnetic field to provide at least three different levels of magnetic field strength based on an amplitude of the object signal determined by the determination device;
   wherein the control device controls the alternating magnetic field so that it does not exceed a predetermined magnetic field strength,
   wherein the transmission device transmits energy inductively from a power supply to a consumer device,
   wherein an accident risk is associated with the object, which is magnetizable or electrically conductive,
   wherein the amplitude of the object signal corresponds to a power absorbed by the object or which corresponds to a size of the object,
   wherein the strength of the alternating magnetic field is adjusted to the signal and accordingly to the size or a magnetic susceptibility of the object, so as to keep an absolute heating of the object at a predetermined level, so as to prevent a premature termination of an energy transmission,
   wherein an energy transfer process last longer due to a reduced strength of the magnetic field,
   wherein a transmitting of a predetermined amount of energy is achievable even if the object is present, and
   wherein the object is an inanimate object.

2. The transmitter as recited in claim 1, wherein the object signal indicates a power absorbed by the object.

3. The transmitter as recited in claim 2, wherein the strength of the alternating magnetic field is determined by a magnetic induction.

4. The transmitter as recited in claim 2, wherein the control device limits an electrical power of the transmission device.

5. The transmitter as recited in claim 1, wherein the transmission device includes a resonance transformer, and the object signal indicates a quality factor of the resonance transformer.

6. The transmitter as recited in claim 1, further comprising:
   a storage device connected to the control device and storing at least one signal amplitude of the object signal and strength of the alternating magnetic field assigned to the at least one signal amplitude.

7. The transmitter as recited in claim 1, wherein there is a discrete relationship between an amplitude of the object signal and a strength of the alternating magnetic field, wherein the strength of the alternating magnetic field is not limited or set to a maximum value, when the object signal is smaller than a first threshold value, and wherein the strength of the alternating magnetic field is set to the value zero, when the object signal is greater than a last threshold value.

8. The transmitter as recited in claim 7, wherein the discrete relationship includes multiple levels, and wherein the discrete relationship between strength levels and signal amplitudes of the alternating magnetic field is non-linear on average.

9. The transmitter as recited in claim 7, wherein there are at least two additional strength levels having different amplitudes, if one of the levels is equivalent to a value of zero.

10. The transmitter as recited in claim 1, wherein there is a continuous relationship between the amplitude of the object signal and the strength of the alternating magnetic field, and wherein the continuous relationship is a linear function or a non-linear function.

11. The transmitter as recited in claim 1, wherein a calibration or a long-term adaption of the evaluation of the amplitude of the object signal is performed based on a determined amplitude of the object signal by determining a maximum value of the determined amplitude of the object signal over a predetermined period of time.

12. The transmitter as recited in claim 11, wherein an offset or a scaling of a parametric evaluation corresponding to a relationship is adapted based on the determined maximum value.

13. The transmitter as recited in claim 11, wherein the determined signal is evaluated based on a corrected parametric mapping of the signal amplitude onto the strength of the alternating magnetic field.

14. A method for controlling inductive wireless transmission of energy, the method comprising:
   generating, via a transmission device, an alternating magnetic field;
   determining, via a determination device, an object signal which indicates an object in the area of a transmission device which generates an alternating magnetic field, wherein the object signal is a function of the power absorbed by the object located in the magnetic field; and
   changing, via a control device, the strength of the alternating magnetic field based on the object signal to provide at least three different levels of magnetic field strength based on an amplitude of the object signal determined by the determination device;
   wherein the control device controls the alternating magnetic field so that it does not exceed a predetermined magnetic field strength,
   wherein the transmission device transmits energy inductively from a power supply to a consumer device, wherein an accident risk is associated with the object, which is magnetizable or electrically conductive, wherein the amplitude of the object signal corresponds to a power absorbed by the object or which corresponds to a size of the object, wherein the strength of the alternating magnetic field is adjusted to the signal and accordingly to the size or a magnetic susceptibility of the object, so as to keep an absolute heating of the object at a predetermined level, so as to prevent a premature termination of an energy transmission, wherein an energy transfer process last longer due to a reduced strength of the magnetic field, and wherein a transmitting of a predetermined amount of energy is achievable even if the object is present, and wherein the object is an inanimate object.

15. The method as recited in claim 14, further comprising:
determining a maximum value of the object signal over a predetermined period of time; and
deriving respective threshold values of the object signal for the at least three levels as a function of the maximum value of the object signal.

16. A non-transitory, computer-readable data storage medium storing a computer program, which is executable by a processor, comprising:
a program code arrangement having program code for controlling inductive wireless transmission of energy, by performing the following:
determining, via a determination device, an object signal which indicates an object in the area of a transmission device which generates an alternating magnetic field, wherein the object signal is a function of the power absorbed by the object located in the magnetic field; and
changing, via a control device, the strength of the alternating magnetic field based on the object signal to provide at least three different levels of magnetic field strength based on an amplitude of the object signal determined by the determination device;
wherein the control device controls the alternating magnetic field so that it does not exceed a predetermined magnetic field strength,
wherein the transmission device transmits energy inductively from a power supply to a consumer device,
wherein an accident risk is associated with the object, which is magnetizable or electrically conductive,
wherein the amplitude of the object signal corresponds to a power absorbed by the object or which corresponds to a size of the object,
wherein the strength of the alternating magnetic field is adjusted to the signal and accordingly to the size or a magnetic susceptibility of the object, so as to keep an absolute heating of the object at a predetermined level, so as to prevent a premature termination of an energy transmission,
wherein an energy transfer process last longer due to a reduced strength of the magnetic field,
wherein a transmitting of a predetermined amount of energy is achievable even if the object is present, and
wherein the object is an inanimate object.

* * * * *